United States Patent
Tomatsu

(10) Patent No.: US 10,592,224 B2
(45) Date of Patent: Mar. 17, 2020

(54) CONFLICT DETERMINATION AND MITIGATION FOR VEHICULAR APPLICATIONS

(71) Applicant: TOYOTA JIDOSHA KABUSHIKI KAISHA, Toyota-shi, Aichi-ken (JP)

(72) Inventor: Nobuyuki Tomatsu, Toyota (JP)

( * ) Notice: Subject to any disclaimer, the term of this patent is extended or adjusted under 35 U.S.C. 154(b) by 52 days.

(21) Appl. No.: 15/925,202

(22) Filed: Mar. 19, 2018

(65) Prior Publication Data
US 2019/0286457 A1    Sep. 19, 2019

(51) Int. Cl.
G06F 8/61    (2018.01)
G06F 9/445    (2018.01)

(52) U.S. Cl.
CPC ............ *G06F 8/61* (2013.01); *G06F 9/44552* (2013.01)

(58) Field of Classification Search
CPC ............................... G06F 8/61; G06F 9/44552
USPC .................................................. 717/174–178
See application file for complete search history.

(56) References Cited

U.S. PATENT DOCUMENTS

| 2013/0080641 A1* | 3/2013 | Lui | H04L 67/10 709/226 |
| 2014/0075517 A1* | 3/2014 | Alrabady | G06F 21/572 726/4 |
| 2014/0090091 A1* | 3/2014 | Prakash | G06F 21/6245 726/30 |
| 2017/0118664 A1* | 4/2017 | Lee | H04W 4/80 |
| 2019/0087203 A1* | 3/2019 | Hu | G06N 5/02 |

FOREIGN PATENT DOCUMENTS

JP    PO2016-60328    4/2016

* cited by examiner

*Primary Examiner* — Qing Chen
(74) *Attorney, Agent, or Firm* — Burbage Law, P.C.; Jon-Michael Burbage; Elizabeth Ruzich

(57) ABSTRACT

The disclosure includes embodiments for providing conflict determination and mitigation for vehicle applications. A method according to some embodiments includes accepting a request to install a vehicle application in an onboard vehicle computer of a vehicle. The method includes retrieving a first conflict table from the vehicle application. The method includes merging the first conflict table with a table set that includes one or more second conflict tables for other vehicle applications installed in the onboard vehicle computer. The method includes analyzing the table set to identify whether activating the vehicle application will create a conflict between the vehicle application and at least one of the other vehicle applications. The method includes determining to activate the vehicle application based on the conflict not being identified.

18 Claims, 13 Drawing Sheets

Context Table 399 for First Example Vehicle Application 300

Second Resource Usages 303 Included in the "Anytime" column

First Resource Usages 302 When Vehicular Context 301 Applies

Vehicular Context 301

*Context Column*

| Resource | Anytime | Vehicle Speed > 20 mph |
|---|---|---|
| Engine | X | X |
| Steering | X | O |
| Display | X | Switchable |
| Communication Unit (tranceiver) | 0 KBPS | 0 KBPS |
| Communication Unit (receiver) | 0 KBPS | 0 KBPS |
| CPU (time/cycle) | 0.1 ms / 30 ms | 10 ms / 30 ms |
| RAM | 10 KB | 1 MB |

| Key | |
|---|---|
| X | = use of the resource is not required |
| O | = use of the resource is required |
| KBPS | = kilobyte per second |
| ms | = millisecond |
| KB | = kilobyte |
| MB | = megabyte |

Figure 3

Context Table 499 for Second Example Vehicle Application 400

| Resource | Anytime | Vehicle Speed > 20 mph and turn signal = off |
|---|---|---|
| Engine | X | X |
| Steering | X | O |
| Display | X | Switchable |
| Communication Unit (tranceiver) | 0 KBPS | 0 KBPS |
| Communication Unit (receiver) | 0 KBPS | 0 KBPS |
| CPU (time/cycle) | 0.1 ms / 30 ms | 10 ms / 30 ms |
| RAM | 10 KB | 1 MB |

- Second Resource Usages 403 Included in the "Anytime" column
- First Resource Usages 402 When Vehicular Context 401 Applies
- Vehicular Context 401
- Context Column

Key

- X = use of the resource is not required
- O = use of the resource is required
- KBPS = kilobyte per second
- ms = millisecond
- KB = kilobyte
- MB = megabyte

Figure 4

Context Table 599 for Third Example Vehicle Application 500

Second Resource Usages 503 Included in the "Anytime" column

First Resource Usages 502 When Vehicular Context 501 Applies

Vehicular Context 501

Context Column

| Resource | Anytime | Vehicle Speed < 15 mph |
|---|---|---|
| Engine | X | X |
| Steering | X | O |
| Display | X | Exclusive |
| Communication Unit (tranceiver) | 0 KBPS | 0 KBPS |
| Communication Unit (receiver) | 0 KBPS | 0 KBPS |
| CPU (time/cycle) | 0.1 ms / 30 ms | 25 ms / 30 ms |
| RAM | 10 KB | 5 MB |

Key

X = use of the resource is not required
O = use of the resource is required
KBPS = kilobyte per second
ms = millisecond
KB = kilobyte
MB = megabyte

Figure 5

Context Table 699 for Fourth Example Vehicle Application 600

Second Resource Usages 603
Included in the "Anytime" column

First Resource Usages 602
When Vehicular Context 601 Applies

Vehicular Context 601

Context Column

| Resource | Anytime | Vehicle Speed > 20 mph and turn signal = on |
|---|---|---|
| Engine | X | X |
| Steering | X | O |
| Display | | Exclusive |
| Communication Unit (tranceiver) | 0 KBPS | 0 KBPS |
| Communication Unit (receiver) | 0 KBPS | 0 KBPS |
| CPU (time/cycle) | 0.1 ms / 30 ms | 15 ms / 30 ms |
| RAM | 15 KB | 2 MB |

| Key | |
|---|---|
| X | = use of the resource is not required |
| O | = use of the resource is required |
| KBPS | = kilobyte per second |
| ms | = millisecond |
| KB | = kilobyte |
| MB | = megabyte |

Examples of Resources
- millimeter wave radar
- LIDAR
- camera
- stereo camera
- ultrasonic sensor
- engine
- high voltage electrical system
- fuel cell system
- motor
- steering system
- brake system
- side window actuator
- turn signal
- trunk door actuator
- moon roof actuator
- door opener actuator
- seat actuator
- electric hood latch
- electric fuel lid latch
- wireless communication

Examples of Context
- anytime
- speed
- turn signal
    - no signal engaged
    - right signal engaged
    - left signal engaged
- vehicle location
    - e.g., highway, surface way, parking garage, home, city area, other information provided by the navigation system or some other vehicular localization system
- driving situation
    - e.g., merging on a highway, exiting a highway, turning left or right, waiting at traffic light, departing location, arriving at a location, vehicle accident, other information provided by the navigation system or some other vehicular localization system
- roadway type
    - e.g., straight, curved, intersection, ascending, descending, number of roadway lanes, etc.
- vehicle occupants
    - driver only
    - driver and occupant in the passenger seat
    - driver and occupant in the back seat
    - driver and occupant in the passenger seat and the back seat
- CPU resource
    - redundant CPU resources
- Infrastructure
    - send or receive via wireless communication

Figure 8

Table Set 900 for First Example Vehicle Application 300 and Third Example Vehicle Application 500

| Resource | Application | Anytime | Context Column Vehicle Speed > 20 mph | Context Column Vehicle Speed < 15 mph | Comment |
|---|---|---|---|---|---|
| Engine | 300 | X | X | X | No conflict |
| | 500 | X | X | X | |
| Steering | 300 | X | O | X | No conflict |
| | 500 | X | X | O | |
| Display | 300 | X | Switchable | Exclusive | No conflict |
| | 500 | X | X | X | |
| Communication Unit (tranceiver) | 300 | 0 KBPS | 0 KBPS | 0 KBPS | No conflict |
| | 500 | 0 KBPS | 0 KBPS | 0 KBPS | |
| Communication Unit (receiver) | 300 | 0 KBPS | 0 KBPS | 0 KBPS | No conflict |
| | 500 | 0 KBPS | 0 KBPS | 0 KBPS | |
| CPU (time/cycle) | 300 | 0.1 ms / 30 ms | 10 ms / 30 ms | 0.1 ms / 30 ms | No conflict |
| | 500 | 0.1 ms / 30 ms | 0.1 ms / 30 ms | 25 ms / 30 ms | |
| RAM | 300 | 10 KB | 1 MB | 10 KB | No conflict |
| | 500 | 10 KB | 10 KB | 5 MB | |

Vehicle Specification
RAM = 1.0 MB
CPU = 50% (15 ms / 30 ms)
Bandwidth (transmission) = 1000 KBPS
Bandwidth (receiver) = 1000 KBPS

Key
X = use of the resource is not required
O = use of the resource is required KBPS = kilobyte per second
ms = millisecond
KB = kilobyte
MB = megabyte

Figure 9

Table Set 1000 for First Example Vehicle Application 300 and Fourth Example Vehicle Application 600

| | | | Context Column | Context Column | |
|---|---|---|---|---|---|
| Resource | Application | Anytime | Vehicle Speed > 20 mph and turn signal = off | Vehicle Speed > 20 mph and turn signal = on | Comment |
| Engine | 300 | X | X | X | No conflict |
| | 600 | X | X | X | |
| Steering | 300 | X | O | O | Conflict |
| | 600 | X | X | O | |
| Display | 300 | X | Switchable | Switchable | No conflict |
| | 600 | X | X | Exclusive | |
| Communication Unit (tranceiver) | 300 | 0 KBPS | 0 KBPS | 0 KBPS | No conflict |
| | 600 | 0 KBPS | 0 KBPS | 0 KBPS | |
| Communication Unit (receiver) | 300 | 0 KBPS | 0 KBPS | 0 KBPS | No conflict |
| | 600 | 0 KBPS | 0 KBPS | 0 KBPS | |
| CPU (time/cycle) | 300 | 0.1 ms / 30 ms | 0.1 ms / 30 ms | 10 ms / 30 ms | No conflict |
| | 600 | 0.1 ms / 30 ms | 0.1 ms / 30 ms | 15 ms / 30 ms | |
| RAM | 300 | 10 KB | 1 MB | 1 MB | No conflict |
| | 600 | 15 KB | 15 KB | 2 MB | |

Vehicle Specification
RAM = 10 MB
CPU = 50% (15 ms / 30 ms)
Bandwidth (transmission) = 1000 KBPS
Bandwidth (receiver) = 1000 KBPS Key
X = use of the resource is not required
O = use of the resource is required ms = millisecond
KB = kilobyte
KBPS = kilobyte per second
MB = megabyte

Figure 10

Table Set 1100 for Second Example Vehicle Application 400 and Fourth Example Vehicle Application 600

| Resource | Application | Anytime | Context Column — Vehicle Speed > 20 mph | Context Column — Vehicle Speed > 20 mph and turn signal = on | Comment |
|---|---|---|---|---|---|
| Engine | 400 | X | X | X | No conflict |
| | 600 | X | X | X | |
| Steering | 400 | X | O | O | No conflict |
| | 600 | X | X | X | |
| Display | 400 | X | Switchable | Exclusive | No conflict |
| | 600 | X | X | | |
| Communication Unit (tranceiver) | 400 | 0 KBPS | 0 KBPS | 0 KBPS | No conflict |
| | 600 | 0 KBPS | 0 KBPS | 0 KBPS | |
| Communication Unit (receiver) | 400 | 0 KBPS | 0 KBPS | 0 KBPS | No conflict |
| | 600 | 0 KBPS | 0 KBPS | 0 KBPS | |
| CPU (time/cycle) | 400 | 0.1 ms / 30 ms | 10 ms / 30 ms | 0.1 ms / 30 ms | No conflict |
| | 600 | 0.1 ms / 30 ms | 0.1 ms / 30 ms | 15 ms / 30 ms | |
| RAM | 400 | 10 KB | 1 MB | 10 KB | No conflict |
| | 600 | 15 KB | 15 KB | 2 MB | |

Vehicle Specification
RAM = 10 MB
CPU = 50% (15 ms / 30 ms)
Bandwidth (transmission) = 1000 KBPS
Bandwidth (receiver) = 1000 KBPS Key
X = use of the resource is not required
O = use of the resource is required KBPS = kilobyte per second
ms = millisecond
KB = kilobyte
MB = megabyte

Figure 11

CONFLICT DETERMINATION AND MITIGATION FOR VEHICULAR APPLICATIONS

BACKGROUND

The specification relates to providing conflict determination and mitigation for vehicle applications.

Vehicle control systems are becoming increasingly popular. One example of a vehicle control system is an Advanced Driver Assistance System ("ADAS system" if singular, "ADAS systems" if plural).

ADAS systems provide one or more autonomous features to the vehicles which include these ADAS systems. For example, an ADAS system may monitor the position of a vehicle relative to the lane in which the vehicle is traveling, and if the vehicle begins to swerve outside of that lane the ADAS system may take remedial action by repositioning the vehicle so that the vehicle stays in the lane or providing a notification to a driver of the vehicle so that the driver knows that they need to take action to remedy the situation.

Some vehicles include a sufficient number and quality of autonomous features that they are considered to be autonomous vehicles.

SUMMARY

A vehicular plug-and-play ecosystem is desirable to automobile manufactures. For example, a vehicle manufacturer wants their vehicles to have an infrastructure which will enable software developers to write software applications for their vehicles (i.e., "vehicle applications") and then have those vehicle applications work the same, or substantially the same, on different makes and models of their vehicles. This is not currently possible using existing solutions. For example, software for an ADAS system (herein, "ADAS software," which is an example of a vehicle application) will operate different for "Vehicle X" relative to "Vehicle Y" if Vehicle X and Vehicle Y have a different make and model, even if Vehicle X and Vehicle Y have the same manufacturer. A vehicular plug-and-play ecosystem solves this problem, for example, by enabling the ADAS software to operate in a similar way regardless of the make and model of the vehicle in which the ADAS software is installed.

One obstacle to providing a vehicular plug-and-play ecosystem is that vehicles include many different types of vehicle applications. For example, a single vehicle may include numerous ADAS systems. Conflicts arise when multiple vehicle applications attempt to use the same vehicle actuator or vehicle resources at the same time. Such conflicts can cause fatal accidents to occur. Currently, such conflicts are avoided because the vehicle applications which are installed in vehicles are tightly managed by the vehicle manufacturer and the vehicle application developers themselves are required to communicate with each other about the vehicle applications they are each developing, and these communications create a situation in which the vehicle applications installed in the vehicles of the vehicle manufacturer are written so that conflicts are avoided. However, in the future it is desired to move to a plug-and-play ecosystem in which this type of developer-to-developer communication does not occur.

In a plug-and-play software ecosystem, vehicle application development cannot be tightly managed by the vehicle manufacturer and the vehicle application developers will not be communicating with each other. This creates a problem since, based on currently available solutions, there is no way of controlling conflicts among vehicle applications that are installed in the vehicles. The conflict system described herein solves this problem as a component of a plug-and-play ecosystem of a vehicle in which vehicle applications can be installed on the fly and without any direct oversight by vehicle application developers or the vehicle manufacturer.

The conflict is an element of an onboard vehicle computer system of a vehicle. In some embodiments, the vehicle is an autonomous vehicle. The National Highway Traffic Safety Administration ("NHTSA") has defined different "levels" of autonomous vehicles, e.g., Level 0, Level 1, Level 2, Level 3, Level 4 and Level 5. If a vehicle has a higher-level number than another vehicle (e.g., Level 3 is a higher-level number than Levels 2 or 1), then the vehicle with a higher-level number offers a greater combination and quantity of autonomous features relative to the vehicle with the lower level number. The different levels of autonomous vehicles are described briefly below.

Level 0: The set of ADAS systems installed in the vehicle have no vehicle control, but may issue warnings to the driver of the vehicle.

Level 1: The driver must be ready to take control of the vehicle at any time. The set of ADAS systems installed in the vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems installed in the vehicle fail to respond properly (based on the driver's subjective judgement). The set of ADAS systems installed in the vehicle executes accelerating, braking, and steering. The set of ADAS systems installed in the vehicle can deactivate immediately upon takeover by the driver.

Level 3: Within known, limited environments (such as freeways), the driver can safely turn their attention away from driving tasks, but must still be prepared to take control of the vehicle when needed.

Level 4: The set of ADAS systems installed in the vehicle can control the vehicle in all but a few environments such as severe weather. The driver must enable the automated system (which is comprised of the set of ADAS systems installed in the vehicle) only when it is safe to do so. When the automated system is enabled, driver attention is not required for the vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

In some embodiments, the vehicle is a Highly Autonomous Vehicle ("HAV" if singular, or "HAVs" if plural). An HAV is a vehicle (e.g., the DSRC-enabled ego vehicle) that includes a set of ADAS systems that operate at Level 3 or higher as described above, or as defined by the NHTSA on page 9 of their policy paper entitled "Federal Automated Vehicles Policy: Accelerating the Next Revolution in Roadway Safety," which was published in September of 2016.

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions.

One general aspect includes a system including a non-transitory memory storing a vehicle application that includes digital data that describes: a vehicular context when the vehicle application is usable by an onboard vehicle computer of a vehicle; a first resource usage of the vehicle application during a first set of times when the vehicular context applies; and a second resource usage of the vehicle application during a second set of times when the vehicular context does not apply. Other embodiments of this aspect include corresponding computer systems, apparatus, and computer programs recorded on one or more computer storage devices, each configured to perform the actions of the methods.

One general aspect includes a method including: receiving a request to install a vehicle application in an onboard vehicle computer of a vehicle, and denying the request responsive to determining that the vehicle application does not include digital data that describes: a vehicular context when the vehicle application is usable by the onboard vehicle computer of the vehicle; a first resource usage of the vehicle application during a first set of times when the vehicular context applies; and a second resource usage of the vehicle application during a second set of times when the vehicular context does not apply. Other embodiments of this aspect include corresponding computer systems, apparatus, and computer programs recorded on one or more computer storage devices, each configured to perform the actions of the methods.

One general aspect includes a method of including: accepting a request to install a vehicle application in an onboard vehicle computer of a vehicle, retrieving a first conflict table from the vehicle application, merging the first conflict table with a table set that includes one or more second conflict tables for other vehicle applications installed in the onboard vehicle computer, analyzing the table set to identify whether activating the vehicle application will create a conflict between the vehicle application and at least one of the other vehicle applications, and determining to activate the vehicle application based on the conflict not being identified. Other embodiments of this aspect include corresponding computer systems, apparatus, and computer programs recorded on one or more computer storage devices, each configured to perform the actions of the methods.

Implementations may include one or more of the following features. The method where the first conflict table includes digital data that describes: a vehicular context when the vehicle application is usable by the onboard vehicle computer; a first resource usage of the vehicle application during a first set of times when the vehicular context applies; and a second resource usage of the vehicle application during a second set of times when the vehicular context does not apply. The method where the vehicle is an autonomous vehicle. The method where the vehicle is a highly autonomous vehicle. The method where the vehicle application is an advanced driver assistance system. The method where the onboard vehicle computer is an electronic control unit. Implementations of the described techniques may include hardware, a method or process, or computer software on a computer-accessible medium.

One general aspect includes a computer program product including a non-transitory memory of a vehicle that stores computer code that is operable, when executed by an onboard vehicle computer of the vehicle, to cause the onboard vehicle computer to execute steps including: accepting a request to install a vehicle application in an onboard vehicle computer of a vehicle; retrieving a first conflict table from the vehicle application; merging the first conflict table with a table set that includes one or more second conflict tables for other vehicle applications installed in the onboard vehicle computer; analyzing the table set to identify whether activating the vehicle application will create a conflict between the vehicle application and at least one of the other vehicle applications; and determining to activate the vehicle application based on the conflict not being identified. Other embodiments of this aspect include corresponding computer systems, apparatus, and computer programs recorded on one or more computer storage devices, each configured to perform the actions of the methods.

Implementations may include one or more of the following features. The computer program product where the first conflict table includes digital data that describes: a vehicular context when the vehicle application is usable by the onboard vehicle computer; a first resource usage of the vehicle application during a first set of times when the vehicular context applies; and a second resource usage of the vehicle application during a second set of times when the vehicular context does not apply. The computer program product where the vehicle is an autonomous vehicle. The computer program product where the vehicle is a highly autonomous vehicle. The computer program product where the vehicle application is an advanced driver assistance system. The computer program product where the onboard vehicle computer is an electronic control unit. Implementations of the described techniques may include hardware, a method or process, or computer software on a computer-accessible medium.

One general aspect includes a system of a vehicle including a processor communicatively coupled to a non-transitory memory that stores computer executable code that, when executed by the processor, is operable to cause the processor to execute steps including: accepting a request to install a vehicle application in an onboard vehicle computer of a vehicle; retrieving a first conflict table from the vehicle application; merging the first conflict table with a table set that includes one or more second conflict tables for other vehicle applications installed in the onboard vehicle computer; analyzing the table set to identify whether activating the vehicle application will create a conflict between the vehicle application and at least one of the other vehicle applications; and determining to activate the vehicle application based on the conflict not being identified. Other embodiments of this aspect include corresponding computer systems, apparatus, and computer programs recorded on one or more computer storage devices, each configured to perform the actions of the methods.

Implementations may include one or more of the following features. The system where the first conflict table includes digital data that describes: a vehicular context when the vehicle application is usable by the onboard vehicle computer; a first resource usage of the vehicle application during a first set of times when the vehicular context applies; and a second resource usage of the vehicle application during a second set of times when the vehicular context does not apply. The system where the vehicle is an autonomous vehicle. The system where the vehicle is a highly autonomous vehicle. The system where the vehicle application is an advanced driver assistance system. The system where the onboard vehicle computer is an electronic control unit. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 3-6 are block diagrams illustrating example conflict tables according to some embodiments.

FIG. 7 is a block diagram illustrating an example set of resources according to some embodiments.

FIG. 8 is a block diagram illustrating an example set of contexts according to some embodiments.

FIGS. 9-11 are block diagrams illustrating example table sets according to some embodiments.

DETAILED DESCRIPTION

Figure 1:
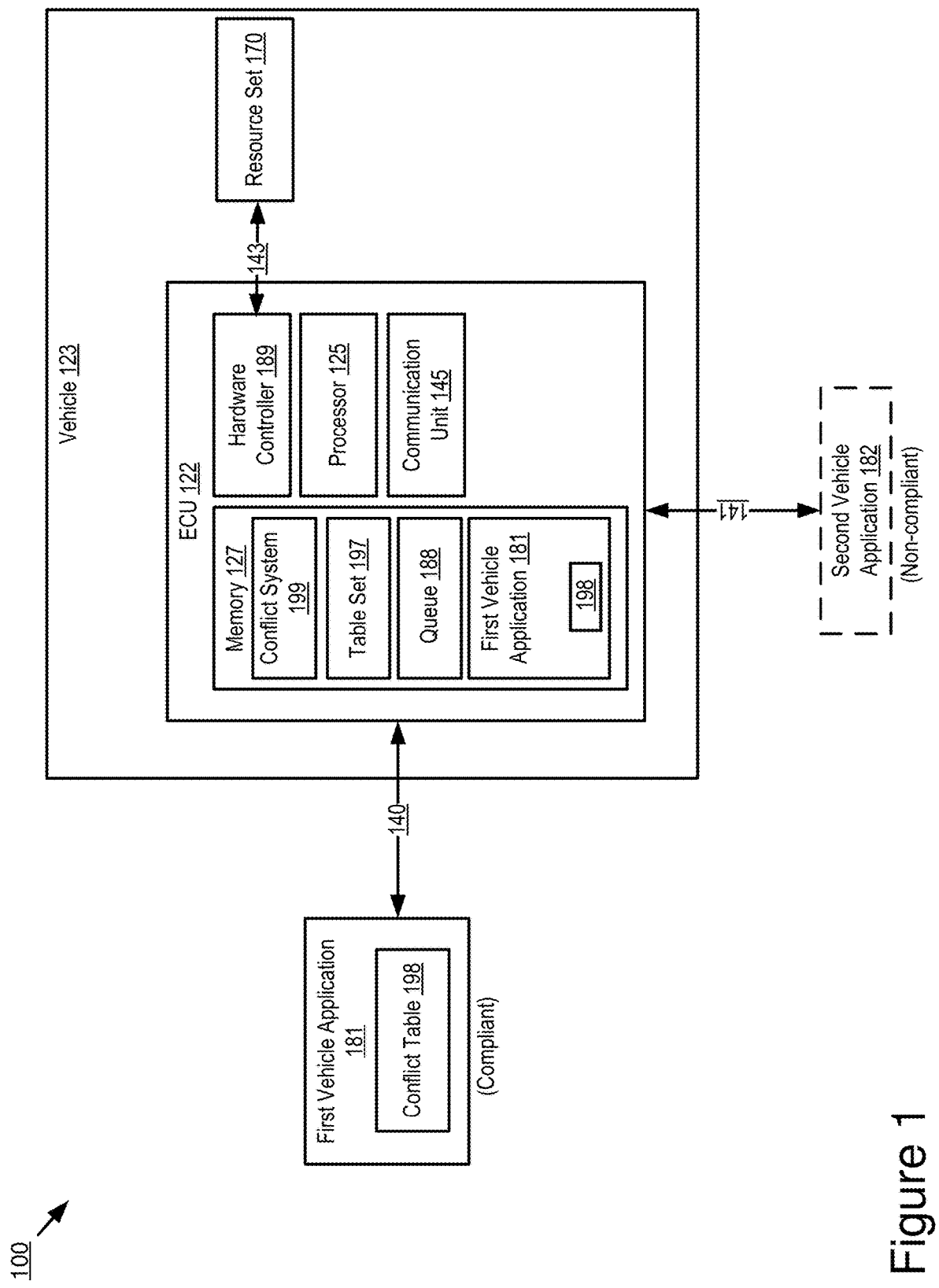
FIG. 1 is a block diagram illustrating an operating environment for a conflict system and a first vehicle application including a conflict table according to some embodiments.

Described herein are embodiments of a conflict system and a conflict protocol that beneficially eliminate conflicts among vehicle applications of a vehicle having a plug-and-play ecosystem.

In some embodiments, the conflict protocol is a set of rules which describes which vehicle applications (e.g., ADAS systems) are allowed to be installed in the vehicle or otherwise made available in the plug-and-play ecosystem. For example, the conflict protocol requires that all vehicle applications include a conflict table within their underlying computer code. The conflict protocol may specify that each vehicle application include the conflict table at one or more locations within their underlying computer code so that the conflict system can assess whether they include a conflict table.

In some embodiments, the conflict protocol specifies a set of requirements for the conflict table. For example, the conflict table for each vehicle application is required to describe: the resource usage of the specific vehicle application that includes the conflict table during different contexts (e.g., one or more vehicle speeds) as well as the resource usage of the vehicle application in all contexts (e.g., anytime the software is active). Examples of resources are depicted in FIG. 7 according to some embodiments. Examples of conflict tables are depicted in FIGS. 3-6 according to some embodiments.

The conflict system includes code and routines that are installed in an onboard vehicle computer of the vehicle. In some embodiments, the code and routines of the conflict system are operable, when executed by the onboard vehicle computer, to cause the onboard vehicle computer to execute one or more of the following steps: (1) analyze vehicle applications before they are installed to determine if they include a conflict table [i.e., determine whether the vehicle applications are compliant with the conflict protocol]; (2) prevent the installation of any vehicle application that does not include a conflict table; (3) aggregate the conflict tables for each vehicle application as the vehicle application is installed in the vehicle; and (4) at runtime, analyze the conflict tables for one or more active vehicle applications and a vehicle application whose operation is queued to be active [e.g., because an onboard vehicle computer of the vehicle seeks to execute the vehicle application] to determine whether there are any conflicts between the queued vehicle application and the one or more active vehicle applications. If there is no conflict at step 4, then the conflict system executes step 5. If there is a conflict at step 4, then the conflict system executes step 6. At step 5, the conflict system allows the queued vehicle application to be activated or launched. At step 6, the conflict system mitigates the conflict by controlling an operation of a hardware controller of the vehicle's software platform to prevent the queued vehicle application from being activated so that the conflicts which would have been caused by activating the queued vehicle application is avoided. By executing these steps, the conflict system beneficially improves the performance of the vehicle by enabling a plug-and-play ecosystem to identify resource conflicts among vehicle applications before they occur and take steps to mitigate these conflicts so that they do not occur. The conflict system also beneficially guarantees that such conflicts will not cause a fatal problem for the vehicle or its human passengers.

Referring to FIG. 1, is a block diagram illustrating an operating environment 100 for a conflict system 199 and a first vehicle application 181 including a conflict table 198 according to some embodiments. As depicted, the operating environment 100 includes the following elements: the first vehicle application 181; and a vehicle 123.

In some embodiments, the operating environment 100 includes a second vehicle application 182. The conflict system 199 includes code and routines that are operable, when executed by the processor 125, to enforce a conflict protocol. The conflict protocol is a set of rules stored in the conflict system 199 and governing which vehicle applications are installed in the vehicle 123 (e.g., installed in the electronic control unit 122 of the vehicle 123). The conflict protocol requires that any particular vehicle application installed in the vehicle 123 must include, as a portion of its computer code, a conflict table (such as the conflict table 198) that is specific for the particular vehicle application whose computer code includes the conflict table.

As depicted in FIG. 1, the first vehicle application 181 is compliant with the conflict protocol because its computer code includes the conflict table 198. Accordingly, the first vehicle application 181 is depicted in FIG. 1 as being stored in the memory 127 of the vehicle 123. The second vehicle application 182 is not compliant with the conflict protocol because the second vehicle application 182 does not store a conflict table. Accordingly, the second vehicle application 182 is not installed in the memory 127 because the conflict system 199 will not permit the second vehicle application 182 to be installed in the vehicle 123. In this example way the conflict system 199 improves the performance of the vehicle 123 by enabling a plug-and-play ecosystem in which vehicle applications which do not comply with the conflict protocol are not installed in the vehicle 123 because, for example, without the conflict table there is no way of know whether executing the vehicle application would create conflicts with other vehicle applications installed in the vehicle when these vehicle applications are simultaneously executed. For the remainder of this description the first vehicle application 181 is referred to as the "vehicle application 181."

The vehicle 123 is a roadway-based conveyance. For example, the vehicle 123 is one of the following types of conveyance: a car; a truck; a sports utility vehicle; a bus; a semi-truck; a drone or any other roadway-based conveyance.

In some embodiments, the vehicle 123 is an autonomous vehicle. For example, the vehicle 123 is one of the following: a Level 1 autonomous vehicle; a Level 2 autonomous vehicle; a Level 3 autonomous vehicle; a Level 4 autonomous vehicle; and a Level 5 autonomous vehicle. In some embodiments, the vehicle 123 is an HAV. An HAV is an autonomous vehicle whose set of ADAS systems provides autonomous functionality sufficient to operate at Level 3 or greater. An example of an onboard vehicle computer for the vehicle 123 is depicted in FIG. 2 according to some embodiments.

As depicted in FIG. 1, the vehicle 123 includes an electronic control unit ("ECU 122"). The ECU 122 is an onboard vehicle computer system. In some embodiments, the computer system 200 depicted in FIG. 2 is an example of an ECU 122.

As depicted in FIG. 1, the vehicle 123 includes the following elements: the processor 125; a communication unit 145; a resource set 170; a hardware controller 189; and the memory 127.

Figure 2:
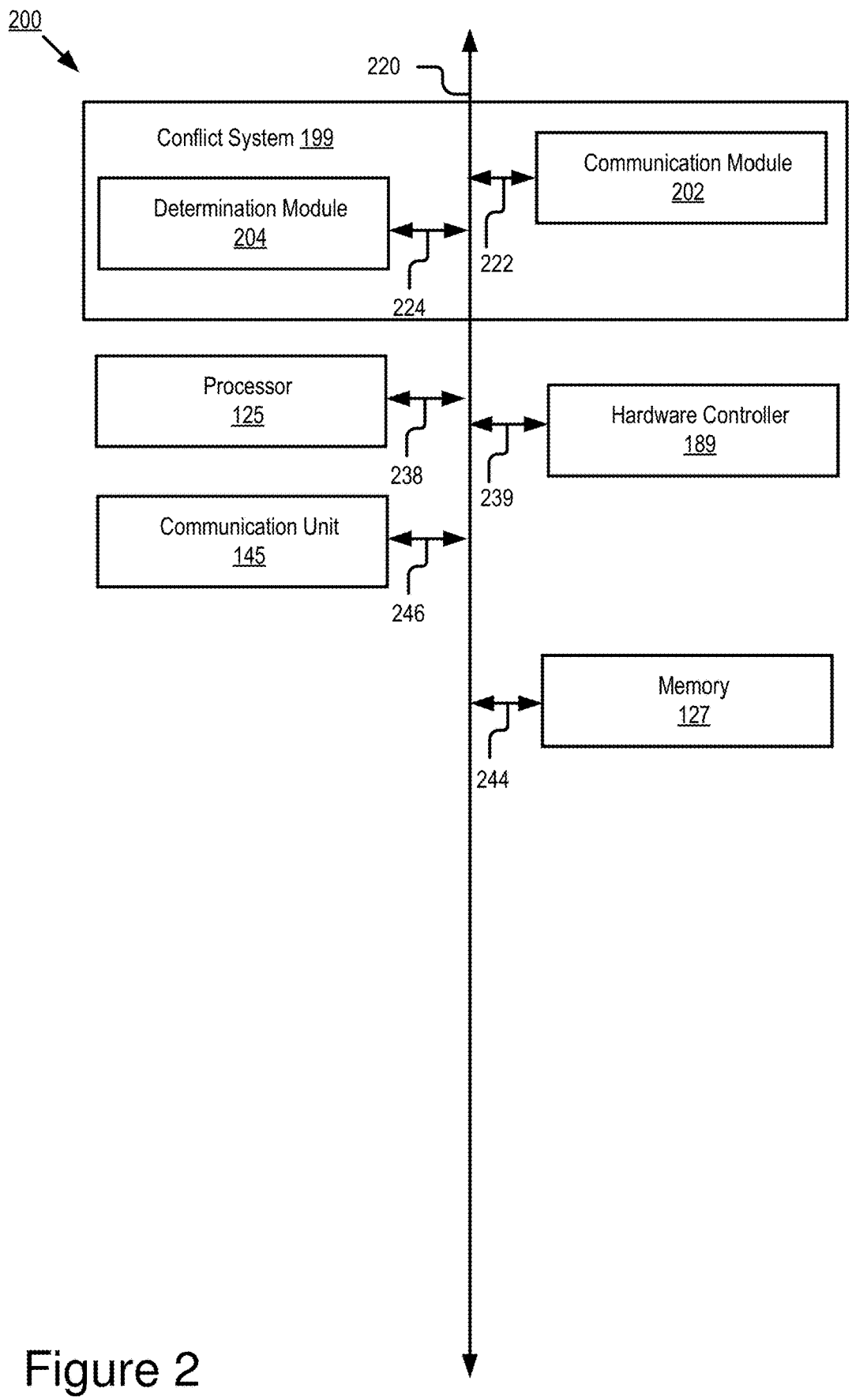
FIG. 2 is a block diagram illustrating an example computer system including the conflict system according to some embodiments.

The processor 125 includes an arithmetic logic unit, a microprocessor, a general-purpose controller, or some other processor array to perform computations and provide electronic signals necessary to provide the functionality of the ECU 122 (or the computer system 200 depicted in FIG. 2). The processor 125 processes data signals and may include various computing architectures including a complex instruction set computer (CISC) architecture, a reduced instruction set computer (RISC) architecture, or an architecture implementing a combination of instruction sets. The ECU 122 (or the computer system 200) may include one or more processors 125. Other processors, operating systems, sensors, displays, and physical configurations may be possible. In some embodiments, the one or more processors 125 are an element of an onboard vehicle computer or electronic control unit of the ECU 122 (or the computer system 200).

The communication unit 145 is an electronic communication interface that is operable to send and receive electronic messages. In some embodiments, the communication unit 145 includes a port for direct physical connection to the ECU 122. For example, the communication unit 145 includes a universal serial bus (USB), secure digital (SD), CAT-5, or similar port for wired communication with the ECU 122.

In some embodiments, the communication unit 145 includes a wireless transceiver for exchanging data with the ECU 122 and other communication-enabled devices using one or more wireless communication methods, including one or more of the following: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 8, 2014 and entitled "Full-Duplex Coordination System"; and another suitable wireless communication method.

In some embodiments, the communication unit 145 includes a full-duplex coordination system as described in U.S. patent application Ser. No. 14/471,387 filed on Aug. 8, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to one or more wireless networks (e.g. an in-vehicle wireless network) for distribution of files or media objects using standard network protocols including TCP/IP, HTTP, HTTPS, and SMTP, millimeter wave, DSRC, etc.

In some embodiments, the communication unit 145 receives one or more of the requests described below with reference to FIG. 12. In some embodiments, one or more vehicle applications are installed in the vehicle 123 via the communication unit 145. For example, digital data that describes the vehicle application 181 is received via the communication unit 145 and installed in the memory 127 by the conflict system 199 if the vehicle application 181 complies with the conflict protocol.

A signal line 140 is used by the communication unit 145 to install the vehicle application 181 responsive to the conflict system 199 determining that the vehicle application 181 includes a conflict table 198 and is therefore compliant with the conflict protocol.

A signal line 141 is used by the communication unit 145 to provide sufficient digital data to the conflict system 199 to determine that the second vehicle application 182 is not compliant with the conflict protocol and therefore cannot be installed in the vehicle 123.

The resource set 170 is a set of one or more resources that provide vehicular functionality. A resource is a vehicular device which provides utility to a component of the vehicle 123. For example, a resource is a vehicle device that provides utility to the vehicle application 181. Examples of the one or more resources included in the resource set 170 are depicted in FIG. 7. The one or more resources included in the resource set 170 are communicatively coupled to the hardware controller 189 via a signal line 143.

The hardware controller 189 is a controller that is operable to control which vehicle applications (e.g., the vehicle application 181 and/or other vehicle applications stored in the memory 127) are able to access a resource included in the resource set 170.

In some embodiments, the hardware controller 189 is architecturally situated between the vehicle applications and the one or more resources included in the resource set 170 so that no resource of the resource set 170 is accessible by any vehicle application of the vehicle 123 except permission of the hardware controller 189. For example, assume the vehicle application 181 is an ADAS system that requires sensor data from a sensor that is included in the resource set 170. In this example, the ADAS system cannot activate the sensor or receive the sensor data without receiving permission from the hardware controller 189 to access this particular sensor of the resource set 170.

In some embodiments, the conflict system 199 controls the operation of the hardware controller 189 based on the table set 197 so that conflicts are not created by either simultaneous usage of a resource or usage of a particular resource which is in excess of the specification for the vehicle 123 or the particular resource.

The memory 127 is a non-transitory storage medium that stores instructions or data that may be accessed and executed by an onboard vehicle computer of the vehicle 123 such as the ECU 122 (or the computer system 200). The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM).

As depicted, the memory 127 stores the following elements: the conflict system 199; the table set 197; a queue 188; and one or more vehicle applications 181 that are compliant with the conflict protocol because they each include a conflict table 198 which is specific to them.

Although only one vehicle application 181 is depicted as stored in the memory 127 in FIG. 1, in practice the memory 127 may store a plurality of vehicle applications 181 which each provide different functionality relative to one another. For example, the memory 127 may store a plurality of different ADAS systems which each provide different functionality relative to one another.

A conflict table 198 is a data structure that describes: the resource usage of the specific vehicle application 181 that includes the conflict table 198 during different contexts (e.g., one or more vehicle speeds) as well as the resource usage of the vehicle application 181 in all contexts (e.g., anytime the software is active). Examples of conflict tables are depicted in FIGS. 3-6 according to some embodiments.

In some embodiments, the conflict table 198 is a data structure that describes: a vehicular context (e.g., speed of the vehicle 123) when the vehicle application 181 is usable by an onboard vehicle computer (e.g., the ECU 122) of the vehicle 123; a first resource usage of the vehicle application 181 during a first set of times when the vehicular context applies (e.g., when the vehicle 123 is traveling at a speed that is greater than 20 miles per hour); and a second resource usage of the vehicle application 181 during a second set of times when the vehicular context does not apply (e.g., at all times when the speed of the vehicle is not greater than 20 miles per hour).

The vehicle application 181 includes code and routines that are operable, when executed by the processor 125, to cause the processor 125 to provide a vehicle functionality to the vehicle 123. For example, the vehicle application 181 is an ADAS system that provides a particular ADAS functionality to the vehicle 123.

Examples of an a vehicle application 181 one or more of the following ADAS systems: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system. Each of these example ADAS systems provide their own features and functionality that may be referred to herein as a "ADAS feature" or an "ADAS functionality," respectively. The features and functionality provided by these example ADAS systems 180 are also referred to herein as an "autonomous feature" or an "autonomous functionality," respectively.

In some embodiments, the autonomous features and autonomous functionality provided by the vehicle application are sufficient to classify the vehicle 123 as one or more of the following: a Level 1 autonomous vehicle; a Level 2 autonomous vehicle; a Level 3 autonomous vehicle; a Level 4 autonomous vehicle; and a Level 5 autonomous vehicle. In some embodiments, the vehicle 123 is an HAV. An HAV is an autonomous vehicle whose vehicle applications, when viewed in the aggregate, provide autonomous functionality sufficient to operate at Level 3 or greater. An example of an onboard vehicle computer for the vehicle 123 is depicted in FIG. 2 according to some embodiments. In some embodiments, FIG. 2 depicts an ECU 122 of the vehicle 123.

The ADAS system may also include any software or hardware included in the vehicle that makes that vehicle 123 be an autonomous vehicle or a semi-autonomous vehicle.

In some embodiments, the vehicle application 181 uses one or more of the resources included in the resource set to provide its functionality.

The table set 197 is digital data that describes a combination of two or more conflict tables 198 for two or more vehicle applications 181. Examples of a table set 197 are depicted in FIGS. 9-11 according to some embodiments.

The queue 188 is a portion of a non-transitory memory that stores: (1) a list of vehicle applications 181 that are waiting to be activated (e.g., executed); and (2) a list of vehicle applications 181 that are currently active (e.g., currently being executed).

The conflict system 199 includes code and routines that are installed in the ECU 122. In some embodiments, the code and routines of the conflict system 199 are operable, when executed by the processor 125, to cause processor 125 to execute one or more of the following steps: (1) analyze vehicle applications 181, 182 before they are installed in the vehicle 123 to determine if they include a conflict table 198 [i.e., determine whether the vehicle applications 181, 182 are compliant with the conflict protocol]; (2) prevent the installation of any vehicle application that does not include a conflict table 198 [e.g., the second vehicle application 182 does not include a conflict table 198]; (3) aggregate the conflict tables 198 for each vehicle application 181 as the vehicle application 181 is installed in the vehicle 123; and (4) at runtime, analyze the conflict tables 198 for one or more active vehicle applications and a vehicle application whose operation is queued to be active [e.g., because the processor 125 seeks to execute the vehicle application] to determine whether there are any conflicts between the queued vehicle application and the one or more active vehicle applications. If there is no conflict at step 4, then the conflict system 199 executes step 5. If there is a conflict at step 4, then the conflict system 199 executes step 6. At step 5, the conflict system 199 allows the queued vehicle application to be activated or launched. At step 6, the conflict system 199 mitigates the conflict by controlling an operation of a hardware controller 189 of the vehicle 123 to prevent the queued vehicle application from being activated so that the conflicts which would have been caused by activating the queued vehicle application is avoided. By executing these steps, the conflict system 199 beneficially improves the performance of the vehicle 123 by enabling a plug-and-play ecosystem to identify resource conflicts among vehicle applications 181 before they occur and take steps to mitigate these conflicts so that they do not occur. The conflict system 199 also beneficially guarantees that such conflicts will not cause a fatal problem for the vehicle 123.

Figure 12:
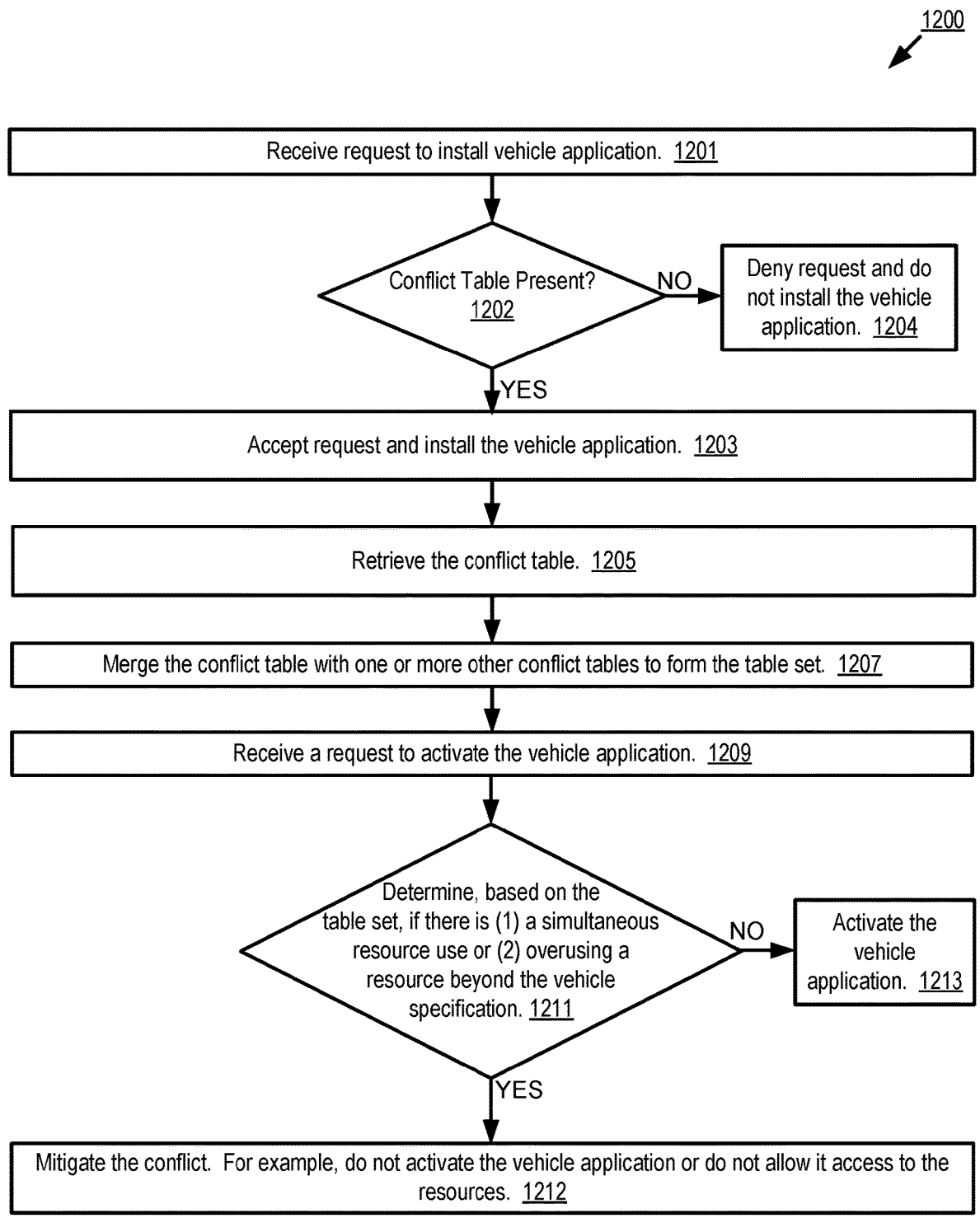
FIG. 12 is a block diagram illustrating an example of a method for determining a conflict among two or more vehicle applications based on a table set according to some embodiments.

In some embodiments, the conflict system 199 executes one or more steps of the method 1200 depicted in FIG. 12.

In some embodiments, the conflict system 199 of the is implemented using hardware including a field-programmable gate array ("FPGA") or an application-specific integrated circuit ("ASIC"). In some other embodiments, the conflict system 199 is implemented using a combination of hardware and software. The conflict system 199 may be stored in a combination of the devices (e.g., one or more ECUs 122), or in one of the devices. Additional elements of the conflict system 199 are depicted in FIG. 2 according to some embodiments.

Referring now to FIG. 2, depicted is a block diagram illustrating an example computer system 200 including the conflict system according to some embodiments.

In some embodiments, the computer system 200 is a special-purpose computer system that is programmed to perform one or more steps of a method 1200 described below with reference to FIG. 12.

In some embodiments, the computer system 200 is onboard vehicle computer of the vehicle 123. For example, the computer system 200 is the ECU 122.

In some embodiments, the computer system 200 is an onboard unit, ECU, head unit or some other processor-based computing device of the vehicle 123.

The computer system 200 may include one or more of the following elements according to some examples: the conflict system 199; the processor 125; the memory 127; the communication unit 145; and the hardware controller 189. These components of the computer system 200 are communicatively coupled by the bus 220.

In the illustrated embodiment, the processor 125 is communicatively coupled to the bus 220 via a signal line 238. The memory 127 is communicatively coupled to the bus 220 via a signal line 244. The communication unit 145 is communicatively coupled to the bus 220 via a signal line 246. The hardware controller 189 is communicatively coupled to the bus 220 via a signal line 239.

These elements of the computer system 200 where described above with reference to FIG. 1, and their descriptions will not be repeated here: the conflict system 199; the processor 125; the memory 127; the communication unit 145; and the hardware controller 189.

In some embodiments, the memory 127 stores any of the data, information or messages described herein. The memory 127 may store any data needed for the computer system 200 to provide its functionality.

In the illustrated embodiment shown in FIG. 2, the conflict system 199 includes a communication module 202 and a determination module 204.

The communication module 202 can be software including routines for handling communications between the conflict system 199 and other components of the computer system 200. In some embodiments, the communication module 202 can be a set of instructions executable by the processor 125 to provide the functionality described below for handling communications between the conflict system 199 and other components of the computer system 200.

The communication module 202 sends and receives data, via the communication unit 145, to and from one or more elements of the operating environment 100 (see, e.g., FIG. 1). For example, the communication module 202 receives or transmits, via the communication unit 145, any of the data stored in the memory 127 or messages (e.g., requests) described herein. The communication module 202 may send or receive any of the data or messages described herein via the communication unit 145.

In some embodiments, the communication module 202 receives one or more messages from the communication unit 145 that includes digital data describing whether a vehicle application 181, 182 includes a conflict table. In some embodiments, the communication module 202

In some embodiments, the communication module 202 may handle communications between components of the conflict system 199.

In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The determination module 204 can be software including routines for executing one or more steps of the method 1200 depicted in FIG. 12. In some embodiments, the determination can be software including routines for executing one or more of the following steps: (1) analyze vehicle applications 181, 182 before they are installed in the vehicle 123 to determine if they include a conflict table 198 [i.e., determine whether the vehicle applications 181, 182 are compliant with the conflict protocol]; (2) prevent the installation of any vehicle application that does not include a conflict table 198 [e.g., the second vehicle application 182 does not include a conflict table 198]; (3) aggregate the conflict tables 198 for each vehicle application 181 as the vehicle application 181 is installed in the vehicle 123; and (4) at runtime, analyze the conflict tables 198 for one or more active vehicle applications and a vehicle application whose operation is queued to be active [e.g., because the processor 125 seeks to execute the vehicle application] to determine whether there are any conflicts between the queued vehicle application and the one or more active vehicle applications. If there is no conflict at step 4, then the conflict system 199 executes step 5. If there is a conflict at step 4, then the conflict system 199 executes step 6. At step 5, the conflict system 199 allows the queued vehicle application to be activated or launched. At step 6, the conflict system 199 mitigates the conflict by controlling an operation of a hardware controller 189 of the vehicle 123 to prevent the queued vehicle application from being activated so that the conflicts which would have been caused by activating the queued vehicle application is avoided.

In some embodiments, the determination module 204 can be stored in the memory 127 of the computer system 200 and can be accessible and executable by the processor 125. The determination module 204 may be adapted for cooperation and communication with the processor 125 and other components of the computer system 200 via signal line 224.

FIGS. 3-6 are block diagrams illustrating example conflict tables 399, 499, 599, 699 according to some embodiments. These conflict tables 399, 499, 599, 699 are provided by way of example, and are not intended to be limiting. The concepts depicted in FIGS. 3-6 build upon one another and are referred to again in FIGS. 9-11 to demonstrate examples of table sets according to some embodiments which are formed from combinations of these conflict tables 399, 499, 599, 699 of FIGS. 3-6.

Referring now to FIG. 3, depicted is a block diagram illustrating an example conflict table 399 for a first example vehicle application 300 according to some embodiments. In some embodiments, the first example vehicle application 300 is a first example of a LKA system.

The right-hand column of the conflict table 399 depicted in FIG. 3 is referred to as the "context column." FIGS. 4-6 depict different conflict tables 499, 599, 699 for different example vehicle applications 400, 500, 600, each of which has a slightly different context column than the one for the first example vehicle application 300 that is depicted in FIG. 3. This is because the resource usage of the different example vehicle applications 300, 400, 500, 600 is implicated differently for different vehicular contexts. For example, the resource usage for one vehicle application may only be implicated based on a speed of the vehicle, whereas the resource usage for a different vehicle application may be implicated based on the speed of the vehicle and whether one of the turning signals for the vehicle are engaged. Also, among vehicle applications whose resource usage is affected by the speed of the vehicle, a first vehicle application may have their resource usage implicated by a first speed threshold (e.g., speeds greater than 20 miles per hour) whereas a different vehicle application may have their resource usage implicated by a second speed threshold (e.g., speeds less than 15 miles per hour).

In FIG. 3, only one vehicular context is relevant to the operation of the first example vehicle application, i.e., the speed of the vehicle and whether the speed is greater than 20 miles per hour.

In the depicted embodiment, the conflict table 399 includes a cell that describes the vehicular context 301 for the conflict table 399. Here, the vehicular context 301 is whether the speed of the vehicle is greater than 20 miles per hour.

In the depicted embodiment, the conflict table 399 includes a column that describes a set of first resource usages 302 that are implicated when the vehicle is traveling at a speed greater than 20 miles per hour. Specifically, when the vehicle is traveling at a speed greater than 20 miles per hour, the first example vehicle application 300 has the following resource requirements: use of the engine (e.g., control of the engine) is not required by the first example vehicle application 300; use of the steering hardware is required; exclusive access to an electronic display of the vehicle is not required (e.g., the access is "switchable" because it is permissible for other vehicle applications, such as an infotainment system, to access the display); access to a transceiver of the communication unit 145 is not required; access to the receiver of the communication unit 145 is not required; access to a processor of the vehicle is required at a frequency of 10 milliseconds per 30 millisecond cycle; and access to 1 megabyte of RAM is required.

The conflict table 399 includes a column that lists a set of second resource usages 303 that apply at all times when the vehicle is traveling at a speed of 20 miles per hour or less. Specifically, when the vehicle is at a speed of 20 miles per hour or less, the first example vehicle application 300 has the following resource requirements: use of the engine (e.g., control of the engine) is not required by the first example vehicle application 300; use of the steering hardware is not required; use of the electronic display of the vehicle is not required; access to a transceiver of the communication unit 145 is not required; access to the receiver of the communication unit 145 is not required; access to a processor of the vehicle is required at a frequency of 0.1 milliseconds per 30 millisecond cycle; and access to 10 kilobytes of RAM is required.

FIGS. 3-6 and 9-11 depict context tables for different vehicle applications. Each of these context tables includes a column that lists various resources on the left-hand side. Included in the list of resources each of these context tables is a display. The display includes its on row in each of the context tables depicted in FIGS. 3-6 and 9-11. The terminology and symbols for this "display" row will now be described. "O" means that the vehicle application requires use of the display to provide its functionality. "X" means that the vehicle application does not require the use of the display to provide its functionality. "Switchable" means that the vehicle applications uses the display to provide its functionality, but other vehicle applications (e.g., an infotainment system) can also use the display. "Exclusive" means that the vehicle application requires exclusive use of the display to provide its functionality.

The symbols "O" and "X" also have meaning for other resources (which are sometimes referred to herein as "hardware"), and not just the display. For example, "O" means that the vehicle application requires the resource/hardware to provide its functionality and "X" means that the vehicle application does not require the resource/hardware to provide its functionality.

Referring now to FIG. 4, depicted is a block diagram illustrating an example conflict table 499 for a second example vehicle application 400 according to some embodiments. In some embodiments, the second example vehicle application 400 is a second example of a LKA system whereas the first example vehicle application 300 of FIG. 3 is a first example of a LKA system.

FIG. 4 builds upon the idea of FIG. 3 by illustrating multiple vehicular contexts are relevant to the operation of the second example vehicle application 400: (1) whether the speed of the vehicle is greater than 15 miles per hour; and (2) whether the vehicle's turn signal is on or off. For example, the second example vehicle application 400 is a second example of a LKA system and, if the turn signal is on, then the driver of the vehicle intends to cross of the dividing line separating two lanes, which is relevant to the operation of the LKA system.

In the depicted embodiment, the conflict table 499 includes a cell that describes the vehicular context 401 for the conflict table 499, i.e., whether the speed of the vehicle is greater than 15 miles per hour and whether the vehicle's turn signal is on or off.

In the depicted embodiment, the conflict table 499 includes a column that describes a set of first resource usages 402 that are implicated when the vehicle is traveling at a speed greater than 20 miles per hour and the turn signal is off. Specifically, when the vehicle is traveling at a speed greater than 20 miles per hour and the turn signal is off, the second example vehicle application 400 has the following resource requirements: use of the engine (e.g., control of the engine) is not required by the second example vehicle application 400; use of the steering hardware is required; exclusive access to an electronic display of the vehicle is not required (e.g., the access is "switchable" because it is permissible for other vehicle applications to access the display); access to a transceiver of the communication unit 145 is not required; access to the receiver of the communication unit 145 is not required; access to a processor of the vehicle is required at a frequency of 10 milliseconds per 30 millisecond cycle; and access to 1 megabyte of RAM is required.

The conflict table 499 includes a column that lists a set of second resource usages 403 that apply at all times when either of the following is true: the vehicle is traveling at a speed of 15 miles per hour or less; or a turn signal of the vehicle is on. Specifically, when either of these is true, the second example vehicle application 400 has the following resource requirements: use of the engine (e.g., control of the engine) is not required by the second example vehicle application 400; use of the steering hardware is not required; use of the electronic display of the vehicle is not required; access to a transceiver of the communication unit 145 is not required; access to the receiver of the communication unit 145 is not required; access to a processor of the vehicle is required at a frequency of 0.1 milliseconds per 30 millisecond cycle; and access to 10 kilobytes of RAM is required.

Referring now to FIG. 5, depicted is a block diagram illustrating an example conflict table 599 for a third example vehicle application 500 according to some embodiments. In some embodiments, the third example vehicle application 500 is a parking assistance system.

In the depicted embodiment, the conflict table 599 includes a cell that describes the vehicular context 501 for the conflict table 599, i.e., whether the speed of the vehicle is less than 15 miles per hour. The conflict table 599 includes a column that describes a set of first resource usages 502 that are implicated when the vehicle is traveling at a speed less than 15 miles per hour. The conflict table 599 also includes a column that lists a set of second resource usages 503 that apply at all times the vehicle is traveling at a speed of 15 miles per hour or more. When the vehicle is traveling at a speed of 15 miles per hour or more, the third example vehicle application 500 requires, among other things depicted in FIG. 5, exclusive access to an electronic display of the vehicle (e.g., for safety reasons because the driver of the vehicle needs to see objects in the path of the vehicle, as well as visual notifications provided by the third example vehicle application 500, as the vehicle is being parked).

Referring now to FIG. 6, depicted is a block diagram illustrating an example conflict table 699 for a fourth example vehicle application 600 according to some embodiments. In some embodiments, the fourth example vehicle application 600 is a lane changing system.

In the depicted embodiment, the conflict table 699 includes a cell that describes the vehicular context 601 for the conflict table 699, i.e., whether the speed of the vehicle is greater than 20 miles per hour and whether the vehicle's turn signal is on or off.

In the depicted embodiment, the conflict table 699 includes a column that describes a set of first resource usages 602 that are implicated when the vehicle is traveling at a speed greater than 20 miles per hour and the turn signal is on. The conflict table 699 also includes a column that lists a set of second resource usages 603 that apply at all times when either of the following is true: the vehicle is traveling at a speed of 20 miles per hour or less; or a turn signal of the vehicle is off.

Referring now to FIG. 7, depicted is a block diagram illustrating an example set of resources 700 according to some embodiments. In some embodiments, one or more of the resources 700 are included in the resource set 170.

Referring now to FIG. 8, depicted is a block diagram illustrating an example set of contexts 800 according to some embodiments. In some embodiments, one or more of the contexts 800 may be a context that is considered by a context column of a conflict table 198.

Referring to FIG. 9, depicted is a block diagram illustrating an example table set 900 that includes the conflict table 399 for the first example vehicle application 300 and the conflict table 599 for the third example vehicle application 500. The table set 900 indicates that the first example vehicle application 300 and the third example vehicle application 500 may be activated simultaneously because no conflict will occur.

Referring to FIG. 10, depicted is a block diagram illustrating an example table set 1000 that includes the conflict table 399 for the first example vehicle application 300 and the conflict table 699 for the fourth example vehicle application 600. The table set 1000 indicates that the first example vehicle application 300 and the fourth example vehicle application 600 should not be activated simultaneously because a conflict will occur. Specifically, both the first example vehicle application 300 and the fourth example vehicle application 600 require access to, or control of, the steering hardware when: (1) the vehicle is traveling at speeds greater than 20 miles per hour; and (2) the turn signal is on. This is an example of a conflict between the first example vehicle application 300 and the fourth example vehicle application 600.

Referring to FIG. 11, depicted is a block diagram illustrating an example table set 1100 that includes the conflict table 499 for the second example vehicle application 400 and the conflict table 699 for the fourth example vehicle application 600. The table set 1100 indicates that the second example vehicle application 400 and the fourth example vehicle application 600 may be activated simultaneously because no conflict will occur.

Referring now to FIG. 12, depicted is an example flow diagram of a method 1200 for determining a conflict among two or more vehicle applications based on a table set according to some embodiments.

At step 1201, a request to install a vehicle application is received.

At step 1202, a determination is made regarding whether a conflict table is present in the vehicle application in a way that conforms to the conflict protocol. If no conflict table is present, then the request is denied at step 1204. If a conflict table is present, then the method 1200 proceeds to step 1203.

At step 1203, the request to install the vehicle application is accepted.

At step 1205, the conflict table for the vehicle application is retrieved and stored in a non-transitory memory.

At step 1207, the conflict table is merged with one or more other conflict tables to form at least one table set.

At step 1209, a request to activate the vehicle application is received. The vehicle application is now a queued application.

At step 1211, a determination is made regarding whether a conflict is present among the vehicle application and one or more other vehicle applications that are already active. If no conflict is present, then the vehicle application is activated at step 1213 and allowed to access the resources it requires to provide its functionality. If a conflict is present, then the conflict is mitigated by the method 1200 proceeding to step 1212.

At step 1212, the vehicle application is either not activated or the vehicle application is activated but not allowed to access the resources it requires to provide its functionality.

Figure 13:
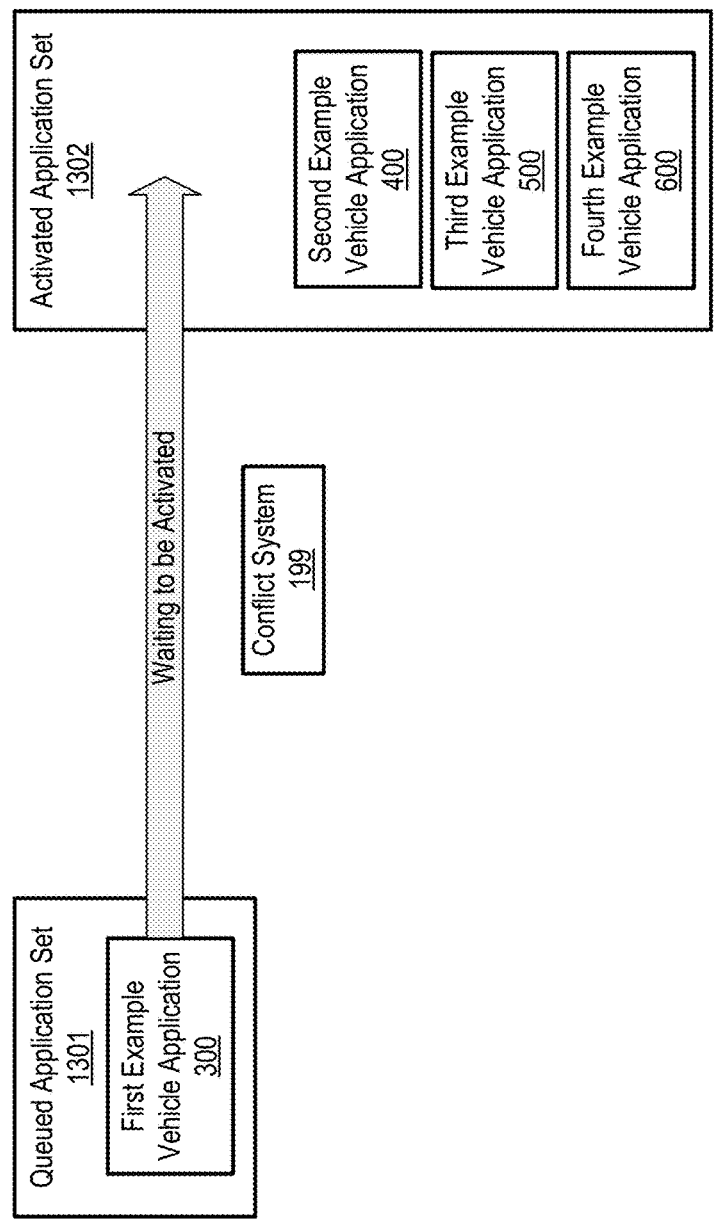
FIG. 13 is a block diagram illustrating an example of a process flow for determining whether to activate a vehicle application according to some embodiments.

Referring now to FIG. 13, depicted is a block diagram illustrating an example of a process flow 1300 for determining whether to activate a first example vehicle application 300 according to some embodiments. The first example vehicle application is added to a queued application set 1301 which includes vehicle applications which are not yet activated but their activation has been requested. The conflict system 199 generates a table set that includes the conflict tables 399, 499, 599, 699 and determines, based on this table set, whether to activate the first example vehicle application 300 which would result in the first example vehicle application being added to the activated application set 1302.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method of providing conflict determination and mitigation for vehicle applications comprising:
   accepting a first request to install a vehicle application in an onboard vehicle computer of a vehicle;
   retrieving a first conflict table from the vehicle application;
   merging the first conflict table with one or more second conflict tables for other vehicle applications installed in the onboard vehicle computer of the vehicle to form a table set;
   receiving a second request to activate the vehicle application;
   analyzing the table set to identify whether activating the vehicle application will create a conflict between the vehicle application and at least one of the other vehicle applications;
   activating the vehicle application based on the conflict not being identified; and
   mitigating the conflict based on the conflict being identified.

2. The method of claim 1, wherein the first conflict table includes digital data that describes:
   a vehicular context when the vehicle application is usable by the onboard vehicle computer of the vehicle;
   a first resource usage of the vehicle application during a first set of times when the vehicular context applies; and
   a second resource usage of the vehicle application during a second set of times when the vehicular context does not apply.

3. The method of claim 1, wherein the vehicle is an autonomous vehicle.

4. The method of claim 1, wherein the vehicle is a highly autonomous vehicle.

5. The method of claim 1, wherein the vehicle application is an advanced driver assistance system.

6. The method of claim 1, wherein the onboard vehicle computer of the vehicle is an electronic control unit.

7. A computer program product comprising a non-transitory memory of a vehicle that stores computer code that is operable, when executed by an onboard vehicle computer of the vehicle, to cause the onboard vehicle computer of the vehicle to execute steps comprising:
   accepting a first request to install a vehicle application in an onboard vehicle computer of a vehicle;
   retrieving a first conflict table from the vehicle application;
   merging the first conflict table with one or more second conflict tables for other vehicle applications installed in the onboard vehicle computer of the vehicle to form a table set;
   receiving a second request to activate the vehicle application;
   analyzing the table set to identify whether activating the vehicle application will create a conflict between the vehicle application and at least one of the other vehicle applications;
   activating the vehicle application based on the conflict not being identified; and
   mitigating the conflict based on the conflict being identified.

8. The computer program product of claim 7, wherein the first conflict table includes digital data that describes:
   a vehicular context when the vehicle application is usable by the onboard vehicle computer of the vehicle;
   a first resource usage of the vehicle application during a first set of times when the vehicular context applies; and
   a second resource usage of the vehicle application during a second set of times when the vehicular context does not apply.

9. The computer program product of claim 7, wherein the vehicle is an autonomous vehicle.

10. The computer program product of claim 7, wherein the vehicle is a highly autonomous vehicle.

11. The computer program product of claim 7, wherein the vehicle application is an advanced driver assistance system.

12. The computer program product of claim 7, wherein the onboard vehicle computer of the vehicle is an electronic control unit.

13. A system of a vehicle including a processor communicatively coupled to a non-transitory memory that stores computer executable code that, when executed by the processor, is operable to cause the processor to execute steps comprising:
   accepting a first request to install a vehicle application in an onboard vehicle computer of a vehicle;
   retrieving a first conflict table from the vehicle application;
   merging the first conflict table with one or more second conflict tables for other vehicle applications installed in the onboard vehicle computer of the vehicle to form a table set;
   receiving a second request to activate the vehicle application;
   analyzing the table set to identify whether activating the vehicle application will create a conflict between the vehicle application and at least one of the other vehicle applications;
   activating the vehicle application based on the conflict not being identified; and
   mitigating the conflict based on the conflict being identified.

14. The system of claim 13, wherein the first conflict table includes digital data that describes:
   a vehicular context when the vehicle application is usable by the onboard vehicle computer of the vehicle;
   a first resource usage of the vehicle application during a first set of times when the vehicular context applies; and
   a second resource usage of the vehicle application during a second set of times when the vehicular context does not apply.

15. The system of claim 13, wherein the vehicle is an autonomous vehicle.

16. The system of claim 13, wherein the vehicle is a highly autonomous vehicle.

17. The system of claim 13, wherein the vehicle application is an advanced driver assistance system.

18. The system of claim 13, wherein the onboard vehicle computer of the vehicle is an electronic control unit.

* * * * *